United States Patent [19]

Lenhart

[11] 4,253,783
[45] Mar. 3, 1981

[54] AIR OPERATED CONVEYOR APPARATUS

[75] Inventor: Ronald A. Lenhart, Lakewood, Colo.

[73] Assignee: Precision Metal Fabricators, Inc., Arvada, Colo.

[21] Appl. No.: 82,650

[22] Filed: Oct. 9, 1979

Related U.S. Application Data

[63] Continuation-in-part of Ser. No. 869,371, Jan. 13, 1978, Pat. No. 4,182,586.

[51] Int. Cl.³ .............................................. B65G 51/02
[52] U.S. Cl. ................................................... 406/86
[58] Field of Search ...................... 406/86, 87, 88, 89, 406/90, 136, 137, 93, 94; 198/347, 443, 453, 493

[56] References Cited

U.S. PATENT DOCUMENTS

| Re. 29,645 | 5/1978 | Kaminski | 406/94 X |
|---|---|---|---|
| 1,853,383 | 4/1932 | Sneed | 198/453 X |
| 2,824,665 | 2/1958 | Lamouria | 198/453 X |
| 3,105,720 | 10/1963 | Barker | 406/88 |
| 3,129,978 | 4/1964 | Szatkowski | 406/94 |
| 3,210,124 | 10/1965 | Niemi et al. | 406/88 |
| 3,556,603 | 1/1971 | Liebenberg | 406/105 |
| 3,941,070 | 3/1976 | Kaminski | 406/86 X |
| 3,953,076 | 4/1976 | Hurd | 406/88 |
| 4,006,812 | 2/1977 | Everett et al. | 198/347 |

Primary Examiner—James L. Rowland
Attorney, Agent, or Firm—Max L. Wymore

[57] ABSTRACT

Air operated material handling equipment for use with similar articles which may be received separately, or en masse from intermediate bulk storage with apparatus for dispensing the articles for movement along one or more guided paths in an organized series of individual pieces disposed closely adjacent one to the other but with additional capability for providing narrow space intervals therebetween whereby the pieces are moved essentially on a single piece basis. Containers having elongated longitudinal axes are moved from an orientation wherein the longitudinal axes are disposed vertically and in side by side relationship through a confined channel having cooperatively curved inner and outer radiuses to a zone of reception and storage wherein the longitudinal axes are disposed in side by side and stacked relationship. Subsequently the articles are moved from such position down guide chutes and/or over a cascade element to separate individual articles and for moving such individual articles in one or more single row arrangements laterally and sidewardly along a guided path wherein the longitudinal axes are horizontally disposed along a single plane with the articles in the desired single piece series arrangement. Jets of air are delivered by angularly disposed nozzles to impinge against the articles for separating such articles from bulk storage and for movement to a single piece aligned position. Additional air is discharged in sheet or bulk air blast to facilitate the desired separation and dispensing of articles and also to prevent damage to such articles when being moved or dropped in somewhat bulk relationships.

19 Claims, 20 Drawing Figures

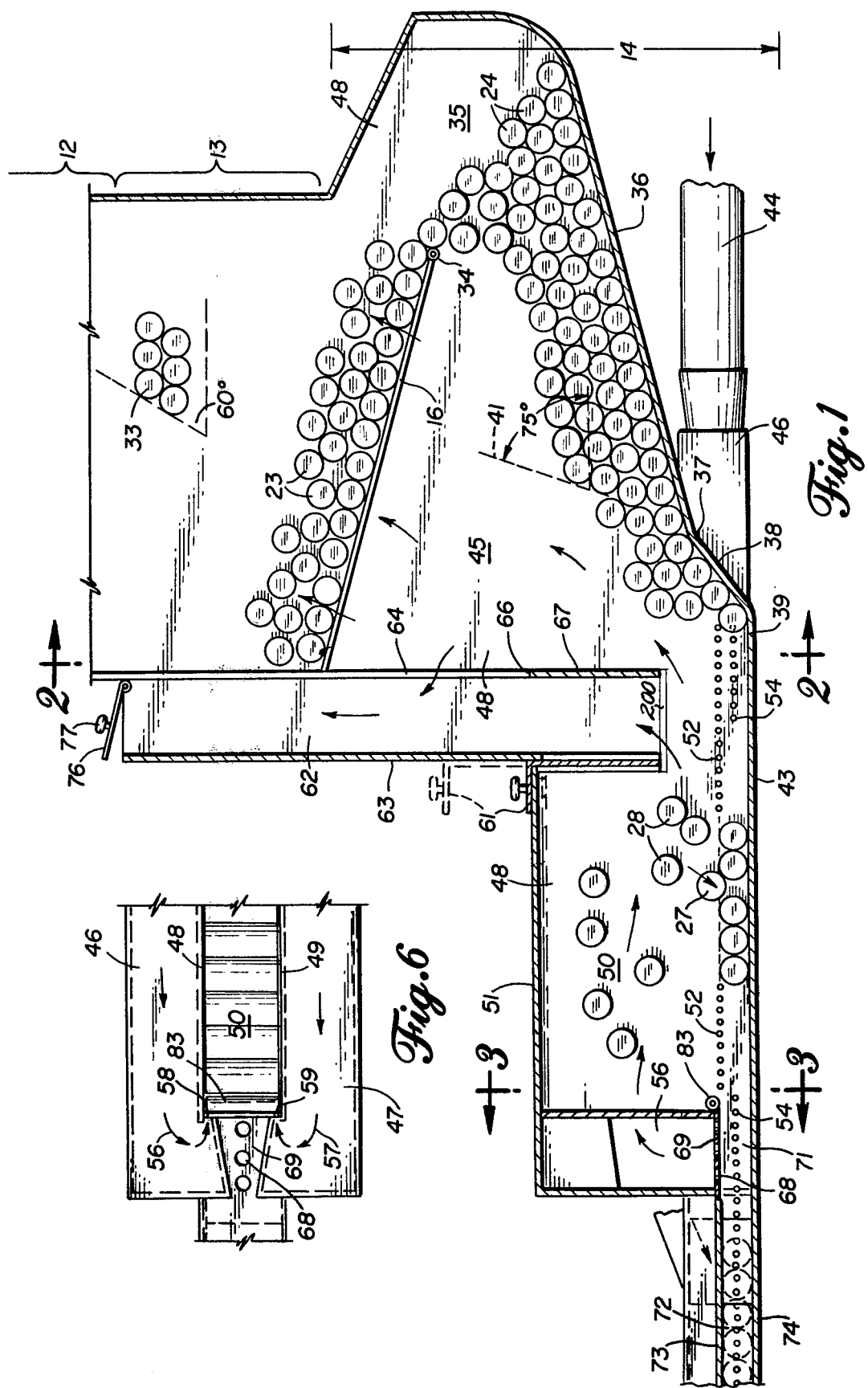

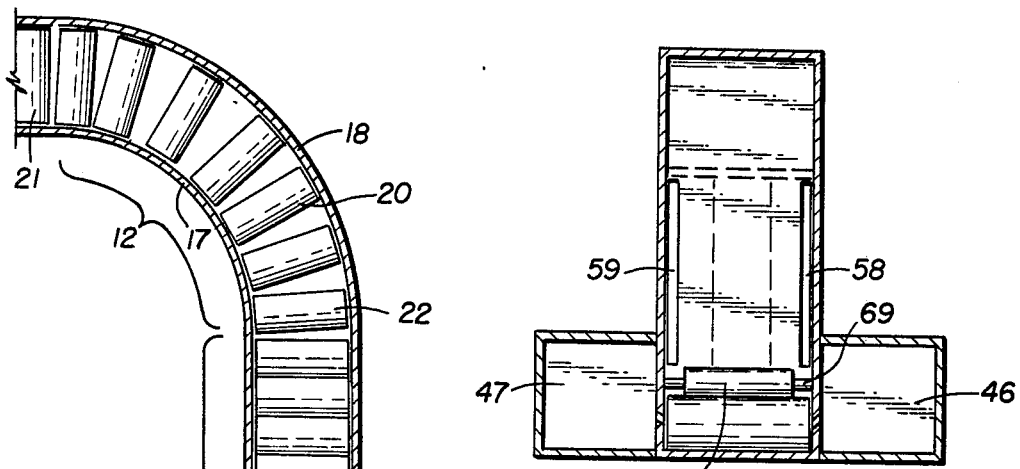
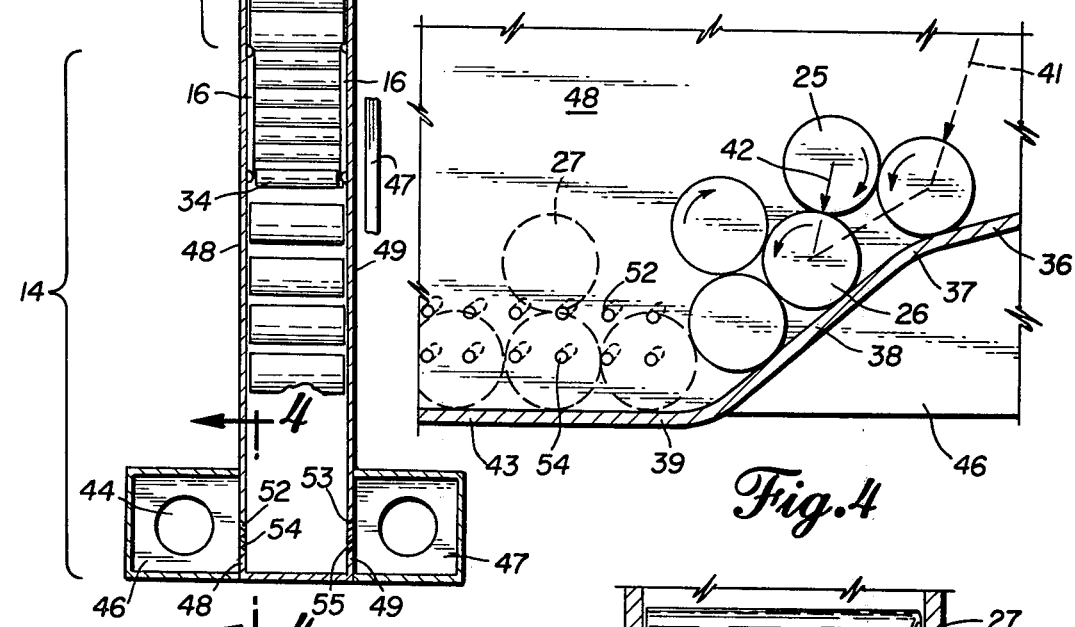

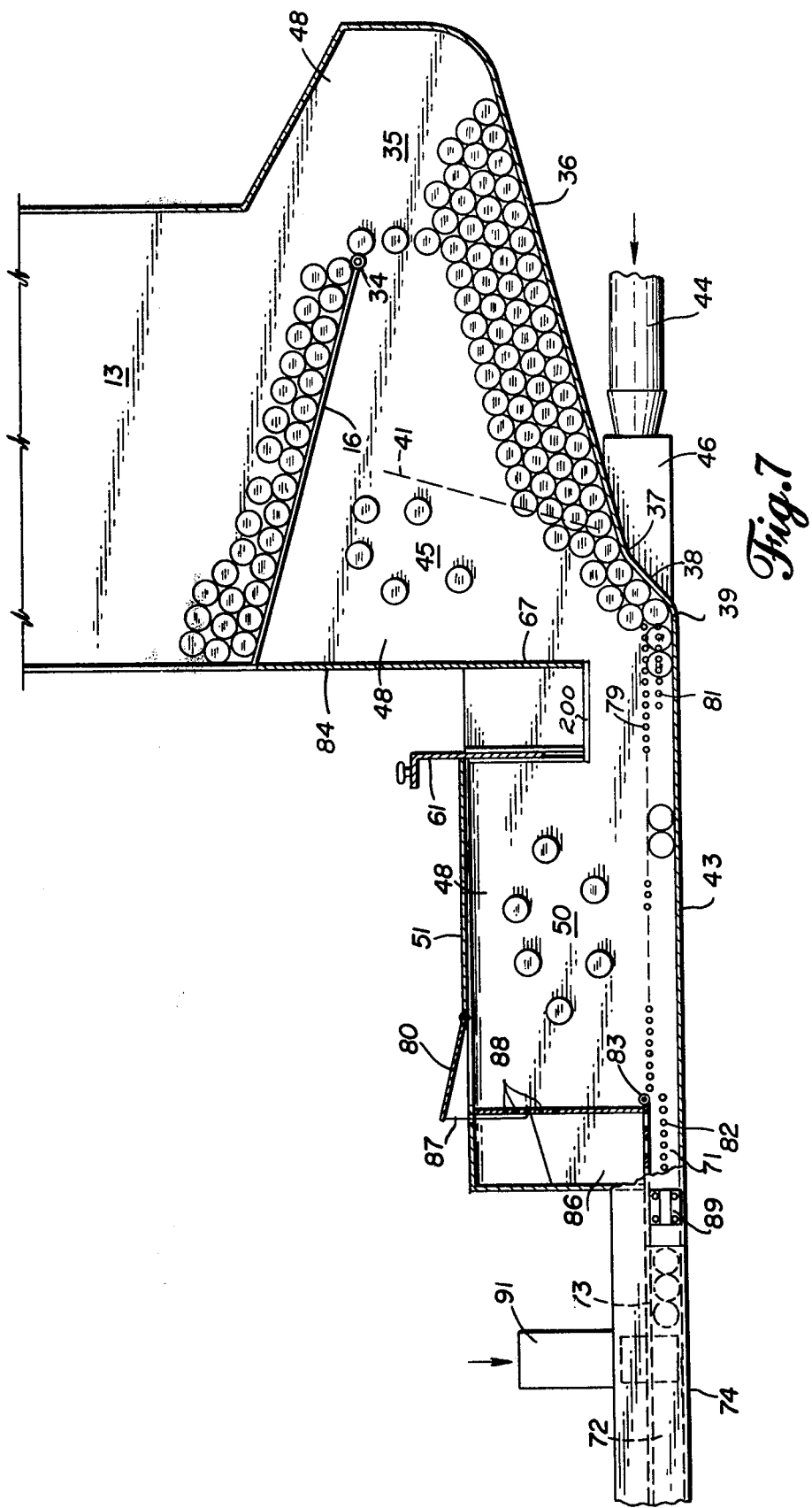

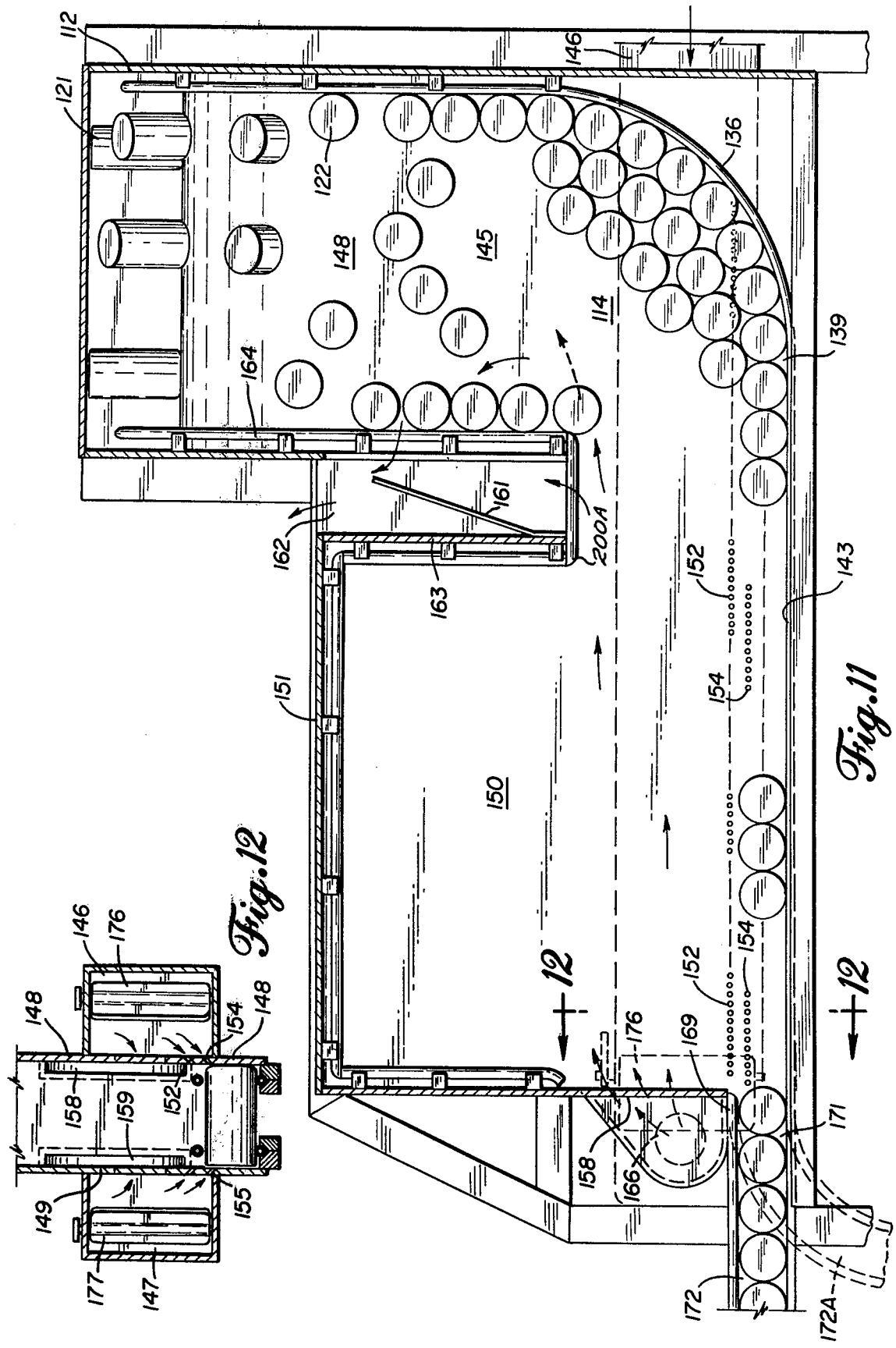

AIR OPERATED CONVEYOR APPARATUS

SUMMARY OF THE INVENTION

This application is a continuation-in-part of U.S. Patent Application Ser. No. 869,371 filed Jan. 13, 1978 entitled AIR OPERATED CONVEYOR APPARATUS now U.S. Pat. No. 4,182,586.

BACKGROUND OF THE INVENTION

Present improvements in container fabricating and filling equipment and the increased production rates required for the more economical presentation of products make improvements in article handling equipment highly desirable. Previously used chain, roller and gravity handling systems may now be considered too inefficient, noisy, cumbersome or mechanicaly unreliable for full satisfaction of present day requirements. In order to provide improved production results, it is acknowledged that others have previously used pressurized air for moving, sorting, elevating, turning and dispensing separable articles of the type to be handled by the apparatus described herein. In general it is believed that the design, operation and results obtained from use of the applicant's new equipment provides a further improved result.

The present invention is directed to the provision of apparatus embodiments that are specifically useful for moving separate articles to and from a zone of bulk storage with the delivery therefrom being on a single piece basis and with the separate single pieces being oriented in a desired side by side relationship. The present embodiments, however, are exemplary of a series or family of inventions set forth in separate applications with each application being directed to a different or varied type of article handling equipment that is characterized by the treatment or movement imparted to the separate articles by such equipment. The present invention embodiments move multiple articles from bulk storage to one or more single file series arrangements and might be generally identified as multiple single filer apparatus. Other inventions are directed to horizontal conveying apparatus with the articles in horizontal or vertical orientation; to article turning apparatus; to table accumulators, etc.

For all such air handling equipment inventions, other than the table accumulators and the bulk storage features of the present invention, an overriding concept or mode of operation is common. Such concept is inherent in the following analyses: when the individual articles are to be moved in other than a bulk arrangement, the air being impinged thereagainst will be of controlled flow, pressure and direction to hold the articles in an individually balanced straight position insofar as possible and with the air discharge being configured to a maximum extent to keep the individual articles in a single piece arrangement whereby interference between adjacent articles and the bulking of weight of multiple articles is avoided. To attain such beneficial and desirable results, novel arrangements and dispositions for pressurized jets and vents are cooperatively utilized.

BRIEF DESCRIPTION OF THE DRAWINGS

FIG. 1 is a side cross-sectional elevation of a preferred embodiment of the invention;

FIG. 2 is a rearwardly directed partial cross-sectional elevation taken along the line 2—2 of FIG. 1;

FIG. 3 is an enlarged forwardly directed cross-sectional elevation taken along the line 3—3 of FIG. 1;

FIG. 4 is an enlarged sectional elevation similar to that of FIG. 1 taken in the zone generally defined by the line 4—4 of FIG. 2 to show features of the cascade element of FIG. 1 in enlarged detail;

FIG. 5 is an enlarged partial cross-sectional elevation similar to that of FIG. 2 showing the position of discharge jets with respect to the size of containers being handled;

FIG. 6 is a partial top plan view of an air turning plenum or blowback nozzle disposed in position of orthographic projection with respect to FIG. 1;

FIG. 7 is a side cross-sectional elevation similar to that of FIG. 1 showing a second embodiment of the invention.

FIG. 11 is a side elevation of a further embodiment of the invention;

FIG. 12 is a forwardly directed elevation taken along the line 12—12 of FIG. 11;

DESCRIPTION OF THE PREFERRED EMBODIMENTS

Figure 8:
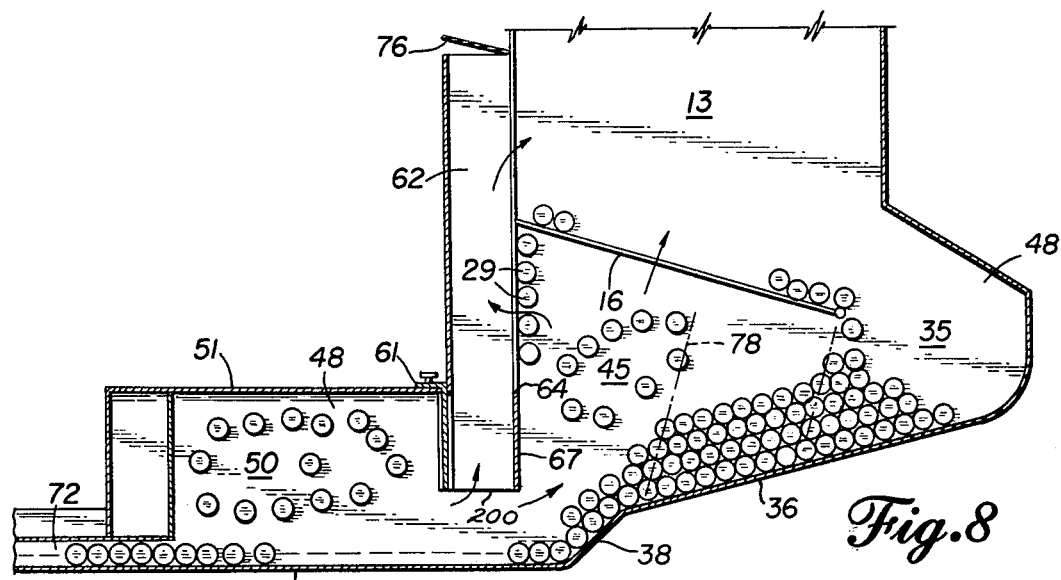
FIGS. 8 through 10 are side views similar to that of FIG. 1 schematically showing varied operational article delivery results for varied air valve and vent configurations.

Structural and operative features of an air single filer invention embodiment are shown in FIGS. 1 through 6 and 8 through 10. In such illustrations the actual single filer components are disposed at the lower reaches of the device, and it should be understood that such air single filer components may be used together with the waterfall and bulk storage components of such illustration, or the same single filer components could be combined with other bulk storage elements and components or could be arranged in a material handling line to receive containers being delivered on a constant or intermittent basis from other container forming apparatus, or printing or filling equipment. Similarly, the air single filer components could be coupled to receive containers in bulk from pallet storage units or from bulk containers wherein bulk shipping cartons or specialty containers package the materials in an already stacked side-by-side relationship.

For purposes of identification, main components in the illustrated embodiment of the invention would include the waterfall segment or zone 12 as shown in FIG. 2, a bulk storage zone 13, and the single filer component identified by the overall zone 14. The upper limit of the single filer zone itself might be operationally defined to include an upper inclined ramp 16 and all of the cans disposed thereon that are in a relatively moving and non-bridging relationship one with respect to the other. The bulk storage zone 13 would then be intermediate the waterfall delivery component 12 and such single filer zone 14.

The waterfall component as illustrated in FIG. 2 simply includes inner and outer radius sheets 17 and 18 which are disposed apart a distance just slightly greater than the length of the containers being handled when measured along their longitudinal axes. With such arrangement each of the containers 20 will be moved in a somewhat fan arrangement wherein the containers are disposed with the longitudinal axes vertically oriented (see container 21) and disposed along the full width of the waterfall to a position where the containers are in side-by-side relationship across the width of the storage zone 13 with the longitudinal axes disposed in a substantially horizontal orientation as indicated by the container 22. The spacing between the curved sheets 17 and 18 will allow slight movement of the containers as they fall in the desired pattern, but the spacing should be closely regulated so that the outside limiting corners of the containers will not be able to tilt sufficiently to cause cocking entrapment thereof. Since the containers fall freely through the waterfall zone 12 and into the bulk storage zone 13, they will have a tendency to be self-stacking in the bulk storage zone and in a most closely nested arrangement wherein the axes of round containers as illustrated will be disposed along a 60° pyramid face angle at the zone 33 as illustrated in FIG. 1.

In the bulk storage zone 13 all of the containers 20 are supported by the upper inclined ramp 16, but the regular 60° stacked arrangement is not maintained throughout such zone, since the lower level of containers will have a tendency to move down the downwardly inclined ramp 16 is a manner that disrupts the stacked arrangement. If the upper inclined ramp 16 is disposed at an angle of 15° with respect to the horizontal, the containers 23 closely thereabove and supported by the upper ramp 16 will have a tendency to move away from the stacked 60° pyramid arrangement, and a movement down and along the ramp 16 will be instituted. The containers will fall freely off the end of the ramp 16 and the small diameter roller 34 at the end of the ramp 16 to fall into a rearwardly disposed area 35 of the single filer component 14. In such rearwardly disposed area 35 of the single filer component 14, containers, such as container 24, will have a tendency to stack in a pyramid arrangement above the lower single filer ramp 36 with the defined face of stacked pyramids of containers then being at an angle of 75° since the lower ramp 36 is itself again disposed at an angle of 15° with respect to the horizontal.

At a relatively low delivery rate of approximately 1000 cans per minute, round containers of the illustrated relative size with respect to the illustrated single filer component will have a tendency to stack up about four to five rows deep along the full length of the lower ramp 36 and to a full depth coming just up under the upper ramp 16 and the end delivery roller 34 adjacent such roller. If a deeper or lesser stack height is desired, the position of ramp 16 and delivery roller 34 may be adjusted. The containers in this rearwardly disposed area 35 and disposed along and above the ramp 36 will have a tendency to move in a regular pattern forwardly and to the left until they are pushed over an action lip 37 which defines, with the cascade ramp 38 and flow-out zone 39, an ogee curve type of weir structure wherein the cascade ramp 38 is disposed at an angle of 50°. A weir nomenclature has been used to describe this cascade element of the single filer component, since the flow of containers or the herein illustrated round cans in the area limited by this ogee curve structure is quite similar to that which might be observed over the spillway or weir or an ogee curved dam. In fact, the construction configuration and size relationships for this cascade element, as shown in FIGS. 2 and 4, have been closely determined and regulated to provide a smooth transition from an accumulated bulk type storage to a single line, single depth, side by side arrangement for round containers that are to be moved from a zone of bulk storage. The angular disposition of the delivery ramp 36, the resultant pyramid face disposition of 75° for the cans disposed thereabove, and the 50° disposition for the cascade ramp 38 provides an arrangement in which the cans in the previous stacked pyramid arrangement, but at a position now out of contact with the ramp 36, have a tendency to push the cans that are on the ramp 38 in a forward direction and apart one from the other so that the cans above and out of contact with the weir shaped cascade element will tend to move downwardly and into contact with the cascade ramp and flow-out zone 39 as the containers are moved out of the bulk storage zone.

The mechanical forces operative are best understood in connection with FIG. 4 where the line 41 would indicate the disposition of an initial pyramid support face angle of 75° and would correspond to the direction of a gravitational force acting along such line. Line 42 interconnecting the axis of cans 25 and 26 indicates a force line of increased angle tending to separate these cans as they move down the cascade surface 38 so that the can 25 can move into position behind can 26. In addition to the direct weight forces acting along lines 41 and 42, it should be observed that the cans will tend to rotate in the directions indicated by the solid curved arrows as they move along the ramp 36 and along the cascade 38. Accordingly, the tendency to move into a single file arrangement will be enhanced. At the bottom of the cascade 38 and in the flow-out zone 39 a near solid contact arrangement for the cans, or a regular spacing of containers, along lower supports will be obtained. Some containers 27, however, will still be observed in position above the lower row of containers that move in contact with a bottom flat track 43 outwardly from the flow-out zone 39.

In addition to the gravitational or mechanical aspects providing the derived movement pattern, the containers in the single filer component and, in fact, those containers in all of the waterfall and bulk storage zones are buffeted and moved directionally by the flow and impingement of air delivered under pressure to obtain or enhance the desired output result.

The containers in the single filer zone are subjected to the action of directed flow jet nozzles in the flow-out zone 39 closely adjacent to the cascade surface 38. Here air under pressure that has been introduced through a conduit 44 to separate plenums 46 and 47 disposed at the opposite lateral sides of the container defining delivery walls 48 and 49 that are, in fact, a continuum of the sidewalls 48 and 49 of the single filer zone 14 and are spaced apart a distance that is slightly greater than the lateral dimension of the container to be worked on. Such sidewalls 48 and 49 are continued out into the single file layout zone 50, which is essentially defined by such sidewalls 48 and 49, a top cover 51 and the bottom track 43. The plenums 46 and 47 are disposed alongside and outside of the walls 48 and 49, as shown in FIG. 2, and a plurality of jet nozzles 52, 54, 53 and 55 are drilled through the walls 48 and 49, respectively, to deliver angularly disposed jets of air against the containers to move the containers down into contact with the bottom track 43 and forwardly therealong to a point of discharge.

The air from the conduits 44 and the plenums 46 and 47 (or at least a portion thereof) that is not delivered through the nozzles 52–55 moves up and rearwardly as indicated by the arrows 56 and 57 for introduction in a rearwardly directed sheet past the slots 58 and 59 and into the interior of chamber 50. Since the slots 58 and 59 are vertically elongated, a sheet type discharge flowing along the inner surfaces of sidewalls 48 and 49 tends to blow any loose cans, such as the cans 28, that may be entrapped in the layout zone 50 in a rearward direction and back toward the single filer zone 14.

The return movement patterns of cans 28 are in large measure regulated by the positioning of a damper 61 that is disposed at a rearward extent of the layout zone 50 for control of air patterns flowing from the air slots 58 and 59 into the zone 50 and rearwardly back into the single filer free air zone 45.

Actually a further element is provided which is operatively intermediate the layout zone 50 and the single filer zone 14. This element is a chimney 62 having a forward wall 63 joined to the sidewalls 48 and 49 and disposed forwardly or downstream from vertically disposed open guide bars 64 which extend inwardly from the sidewalls 48 and 49 to prevent loss of containers 20 etc. up the chimney. The guide bars 64 terminate at the line 66. Therebelow a plate diaphragm 67 that extends full distance between the sidewalls 48 and 49 is provided as an operative separator between the zones 50 and 45 if the damper 61 is moved to a full retracted or up position. A pair of guide bars 200 are provided to either side of the bottom opening of the chimney and extend inwardly from sidewalls 48 and 49 also to prevent loss of containers up the chimney.

In addition to the excess air that moves in reverse pattern as indicated by the arrows 56 and 57, a portion of such air will be exhausted through openings 68 in a confining top 69 which is positioned a distance above the bottom 43 corresponding to the diameter of dimension of the containers being handled. Accordingly, as the containers 20, etc. are moved out of the zone 50, they must move out and through a confining segment 71 defined by the sidewalls 48 and 49, the track or bottom 43 and the confining top 69. At such point the containers are in a single file side-by-side disposition with the longitudinal axes disposed in horizontal position and can be moved from there into a carrier track structure 72 having top and bottom confining side rails 73 and 74. Likewise the containers could be moved into a track wherein the sidewalls and top or sidewalls and bottom were of closed plate construction so that air would not escape therethrough. For the embodiment illustrated, guide rails 74 are used interiorly of the plate type confining sidewalls with the guide rails extending inwardly a distance of three-fourths to one inch with the remainder of the bottom being open for the escape of air or misaligned or damaged cans.

A separate plenum is desirably provided for any carrier track 72 and the air supply therefor. The plenums can be provided air under pressure by the same blower hooked to the conduit 44 and the plenums 46 and 47 or by separate air pressurizing devices. The carrier track 72 may be horizontally disposed, or it may be inclined, curved or vertical. The operating principles utilized will, accordingly, be different. Usually the air pressures to be used in the track carrier segment disposed downstream or past the single filer might be different, and, accordingly, separate blower or separate air pressure will be used. At least air valving or control features would be utilized at the output of the single filer and at the point of introduction of containers into the next carrier track segments.

It is intended that the single filer apparatus shown and described will be used at various installations and will, as previously stated, be coupled in systems to handle containers out of packaging equipment, gravitational flow equipment, or other installations. Necessarily, the manufacturing or handling capacity of all such units is not the same, and it is desirable that the single filer apparatus be adaptable for use at varied input and output rates. Changes in the handling capacity of the present embodiment are beneficially accomplished through use of air control, air valving and air directional components. As previously set forth in connection with the chimney 62, a damper 61 is provided that serves as a primary means for changing air flow patterns within the device and in a manner that will effectively change the flow delivery rate for the single filer. In FIG. 1 the damper 61 is in full down position, and in this position an air circulating pattern from the layout zone 50 and into the single filer and storage zones is generated. The return flow air through the slit nozzles 58 and 59 passes under the lowered damper 61 after engaging any circulating cans 28 and cans in the position 27. A portion of the air will pass under the plate diaphragm 67 to move some of the excess cans back into the zone 45. In operation, at an output rate of 1,000 cans per minute, it has been observed that 10 or 15 cans will not be in stacked relationship behind the slope face 41 but will be freely circulating in the air fowardly of the line 41. Five or six cans will be circulating in layout zone 50 in the area adjacent the can 28, and two or three freely moving cans may be at a position just above a bottom row of cans (see can 27). The air flow pattern for return air, after it has passed under the plate 67, returns past the guide bars 64 and up the chimney 62 to be exhausted past the chimney vent 76, which is itself provided with a weight 77 that can be sized in accordance with the use of the device or that may be of variable weight, such as a cup to be filled with loose materials. Further, such vent 76 may provide support for a weight on an extended lever arm with the weight being moved along the lever arm to adjust the force tending to close the vent 76. A small portion of air recirculated from the zone 50 may course directly up the chimney 62 while guides 200 prevent any cans from passing up the chimney.

Figure 9:
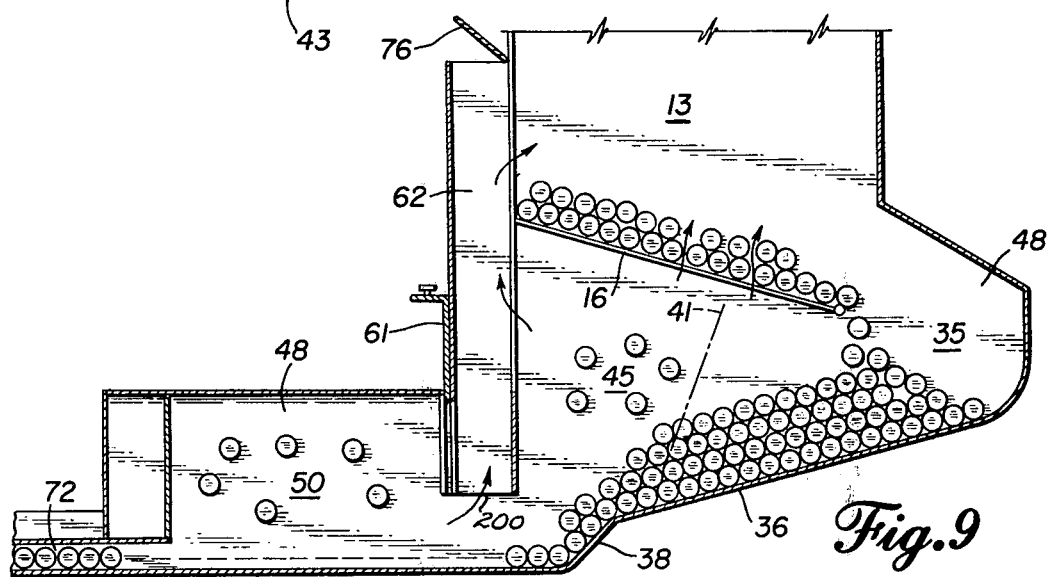
Figure 10:
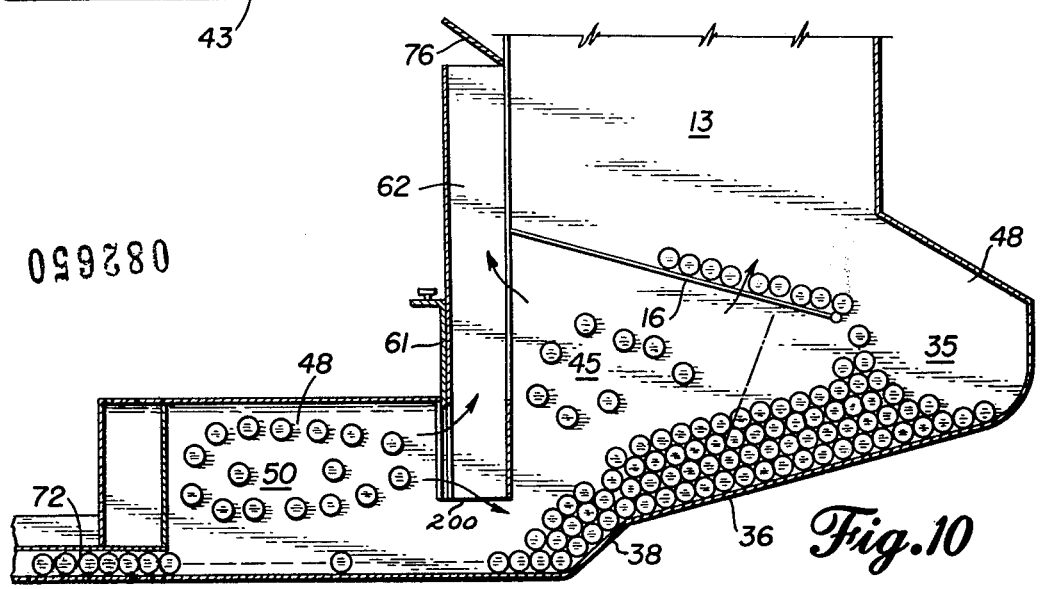
Figure 14:
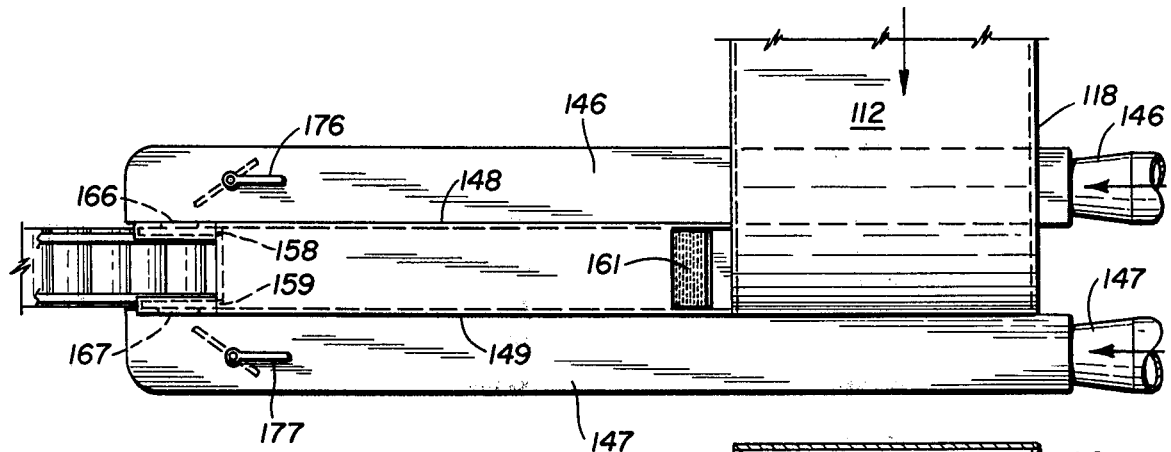
FIG. 14 is a partial top plan view of the apparatus shown in FIG. 13.

Other represenatative patterns for varied delivery rates are shown schematically in FIGS. 8 through 10. FIG. 8 illustrates the condition where cans are not being delivered by the single filer apparatus. Under such circumstances cans will be stacked above the lower ramp 36 about four or five rows deep in a pyramind arrangement with a 75° face angle as indicated by the dotted line 78. A quantity of cans 29 will be disposed against the open rails 64 to partially block the escape of air past such rails and up the chimney 62. As in the FIG. 1 configuration, the damper 61 will be down for this no-operation condition. If the damper is moved to the up position and no cans are being delivered, most all of the air will be exhausted out of the chimney 62 and past the vent 76. Up to fifteen cans might then be circulating in the zone 50, and about five cans will be circulating in the zone 45.

FIG. 9 shows the air flow and can dispersal configuration when running approximately 1,600 cans per minute. For this condition the damper 61 will be up and the vents 76 will be full up. Four or five cans will be circulating in zone 45, and five to six cans might circulate in zone 50. The face slope disposal of cans will be somewhat comparable to that of the FIG. 1 1,000-can delivery operation with the cans being arranged in echelon positions again defining a fall-away line 41. For this condition it is noted that more air circulates back into the zone 45, and if the cans on the essentially open ramp 16 are four or five cans deep, air flow upwardly through such ramp is substantially blocked. Under such condition the air will flow backwardly into the chimney 62 past the guide bars 65, and it will then come back into the accumulator zone 13. This air flow into the accumulator zone operates beneficially to cushion cans free-falling from the waterfall 12 and helps to limit or minimize any damage that might be occasioned thereby.

FIG. 10 illustrates operation of the first embodiment of the invented air single filer operating at the rate of approximately 2,000 cans per minute. For this rate of operation the damper 61 will again be up, but the flow of cans from the accumulator zone 13 downwardly along the ramp 16 must be substantially increased so that the echelon rows of cans disposed above the lower ramp 36 will be deeper. For such operation, cans will essentially fill all of the zone 35, and the weight of such cans will itself tend to force more containers downwardly along the ramp 36. A similar increased depth of cans will be noted above the ramp 38. With increased air pressures a greater quantity of cans will be circulating in the zone 50 with approximately fifteen to twenty cans being involved in the movement pattern in such zone. Approximately eight cans will be circulating in the zone 45. As described in connection with FIG. 9, if only a minor depth of cans is retained on the ramp 16, enough air will circulate upwardly past the can sidewalls to cushion the cans that are released by waterfall 12 to drop into the accumulator zone 13. If a greater depth of cans occurs above the ramp 16 in a manner that would tend to cut off a direct upward flow of air from the zone 45 into the accumulator zone 13, air will merely bypass the ramp 16 and course up the chimney to be reintroduced into the zone 13 at a position above ramp 16 to provide the beneficial can cushioning effect.

In addition to the air flow patterns shown and described in connection with FIGS. 1 and 8 through 10, the separate containers or cans are also subjected to forces directed thereagainst through use of a plurality of jet nozzles which directionally deliver air under pressure from the side plenums 46 and 47. Desirably, the nozzles are arranged in a regulated order so that the cans will be moved in a regular pattern as they are subjected to successive air pulses delivered by the row arranged nozzles. A desirable arrangement of nozzles and the row arrangement thereof are shown in FIGS. 1 through 5.

The upper rows of nozzles, which are continuous through the lay-down section corresponding to the zone 50 and in all positions past the weir 39, are disposed in a downwardly and forwardly directed disposition where they pass through the walls 48 and 49. These upper-rows of nozzles 52–53 have discharge openings at a position approximately one-eighth inch above the top extent of the container with the inlet end thereof being higher and rearwardly thereof. The second or lower echelon rows of openings 54–55 are discontinuous with a first section disposed adjacent the layout weir section at 39 and extending downstream therefrom a distance of approximately three containers or about eight inches. The outlet ends of these holes, which are again forwardly and downwardly drilled, are disposed at a discharge position that is at the center line of the cans or containers being handled to deliver jets of air downwardly and forwardly against the top and bottom of the can or container or into the interior thereof if open.

The lower echelon rows of openings 54–55 are not continuous throughout the zone 50, but such lower row of nozzles resumes at a position adjacent the confining segment 71 disposed downstream and at the end of the single filer component apparatus. The lower rows of nozzles 54 and 55 reoccur to provide a second section at a point adjacent a suppression roller 83 and just ahead of the confining top 69 which helps, together with the bottom rail 43, to define the terminal confining segment 71. The nozzles in the rows 54 and 55 of this second section are again forwardly and downwardly directed so that the air jets emanating therefrom will tend to force the containers or cans through the segment 71 in a one-by-one pattern arrangement and out of the single filer apparatus.

Where open top cans or other nonregular containers are being handled, the air introduced through the directionally oriented nozzles 52 and 54 may have a different velocity than that being introduced at the same time through the nozzles 53 and 55. If open top cans are being handled, the bottom end thereof will necessarily be of heavier weight. In order to avoid chattering of the cans as they pass along the bottom rail 43 or through the confining segment 71, the air in plenum 47 may be maintained at a slightly increased pressure when compared to the air being delivered by the plenum 46. Accordingly, the air delivered through the nozzles 53–55 and against the closed bottom ends of the cans 20–27 as shown in FIG. 5 will have a slightly increased velocity. With the increased velocity the carrying capacity of the air out of plenum 47 will be increased, and the cans 27 can with proper air pressure adjustments be maintained in a regular and balanced movement pattern. It has been found that where aluminum cans are being handled that have a closed bottom the differential of air pressure between the plenum 47 servicing nozzles at the bottom of the cans and the plenum 46 providing air to the top of the can will be approximately 10%. Accordingly, if the air in plenum 47 is at a pressure of eight inches of water static pressure, the air that will be impinged to carry the open top will be at a water pressure of approximately 7.2 inches. A similar differential in pressure is maintained for all the varied can delivery rates enumerated in connection with the description of FIGS. 8 through 10.

All of the holes or jet nozzles disposed in the rows 52–55 are drilled in a downward and forward direction with respect to the movement pattern for the containers. In the embodiment illustrated each of the separate holes have a diameter of approximately 3/16ths of an inch, and the holes are drilled on a ½ inch center-to-center spacing pattern. With such arrangement the air from a plurality of jet nozzles engages each can at any time and as it is progressively moved along the bottom rails 43. The disposition of the outlet ends of the nozzles in rows 52 and 53 beneficially provides an improved result, since the air from these hole-nozzles tends to keep the cans in a position of contact with the bottom rails 43 at the same time that the forward direction of the nozzles tends to move the containers along such rail. If a space exists between adjacent containers, the same nozzles will tend to engage the bottom lip of a can loosely moving in the zone 50 to move such can down toward engagement with the bottom rail and into a position intermediate previously adjacent cans. The nozzles in the first section rows 54 and 55 are provided to accelerate the cans as they move away from the weir layout section 39. The air from such first section nozzles in the rows 54 and 55 and also the air directed against the cans by nozzles in the top rows 52 and 53 at this weir layout position are used to suppress any tendency of cans that are already in contact with the guide rails to move up and away therefrom due to the weight and flow of cans progressing down the weir 38.

Distinguishing features of a second embodiment of the invention are shown in FIG. 7. In general, this embodiment of the invention is intended for use when a higher delivery rate is required. The embodiment has been used to deliver open-ended aluminum containers at a rate of 2,500 cans per minute. In order to obtain this high delivery rate, certain components of the embodiment are changed to handle a higher flow delivery for the air that is used to control the circulation of the containers in the zones 50 and 45 and also for higher pressures at the points of nozzle release along the lower rail 43.

As in the previous embodiment, an accumulator zone 13 receives the containers from either the waterfall zone shown in FIG. 2 or from another source. The containers fall into contact with the upper inclined ramp 16 and again fall downwardly therefrom past the roller 34 to be received in stacked arrangement in the zone 35 and also in pyramid distribution above the lower delivery ramp 36. The cans next course downwardly over the cascade ramp 38 of a weir section similar to that illustrated and described in FIGS. 1 and 5. At the bottom of the ramp 38 a full row of suppressor nozzles 79 engages the top surface of the containers to move the containers into a one-by-one pattern arrangement along the lower rail 43. As in the previous embodiment, a first section of impeller nozzles is provided at 81 adjacent the flow-out zone 39 for the weir, and a second section of such impeller nozzles 82 is provided adjacent the confining segment 71 adjacent suppressor roller 83. The air from the supply 44 and from plenums 46 and 47 (not shown) is delivered to the rows of nozzles 79, 81 and 82 in the manner previously described.

A back flow of control air is again established from an initial point of introduction of back flow chamber 86 adjacent the downstream end of the zone 50. At this point return air is introduced in reverse direction into the chamber 50 where it will circulate approximately the six cans shown as it attempts to move such cans down into the output row of cans moving in contact with the bottom rails 43 or backwardly into the weir section so that such loose cans can be introduced into such output flow. A damper 61 is again used to regulate the amount of reverse air flow that is to be introduced backwardly and into the zone 45. The air that is not exhausted past the damper 61 will be moved back past the plate diaphragm 67 and into the chamber 45. With the changed flow pattern used in connection with this embodiment, the plate disphragm 67 is essentially continued upwardly to provide a wall 84 that prevents any additional escape of air from the zone 45. With this arrangement all control air that is moved into the zone 45 will have to exhaust upwardly and through the upper ramp 16 or through loose cans in the zone 35 to reach the accumulator zone 13.

In order to handle containers at the desired delivery rate, a considerably increased pressure is contemplated at plenums 46 and 47. In order to control an otherwise excess of air that might move into the back flow chamber 86 and into the zone 50 in the reverse flow direction, a separate back vent 80 is provided that will allow escape of air directly from the chamber defining the zone 50. An adjustably positioned door of such back vent 80 is held in selected position through use of a hook support 87, the free end of which may be engaged into a plurality of variably positioned openings 88 so that the back vent door 80 will be held in fixed position once it is adjusted.

At the end of this single filer embodiment a counter 89 may be used to count the number of cans and the flow rate therefor for all cans exiting the confining segment 71. The additional structure shown downstream and past the counter 89 is representative of a carrier track structure 72 that can receive the containers delivered by the single filer to carry such containers horizontally away therefrom. The carrier track structure is again inclusive of top and bottom container confining side rails 73 and 74. The conduit 91 is representative of a new air input that is used to service the carrier track structure 72. Air introduced through this conduit will be delivered to plenums disposed at sides of the track structure 72 so that the cans or other containers will be moved in regular pattern away from the single filer.

Again, while separate air supplies at 44 and 91 are suggested for the single filer apparatus and for any alternately used downstream container handling apparatus, it would be possible to run a single filer and downstream delivery apparatus from a single source of air under pressure. Pressure control and delivery control valves would be utilized so that the best pressure and air flow delivery rates could be provided for each separate material handling component.

A further embodiment of the invention is shown in FIGS. 11 through 14. This configuration of the invention is intended for use where less space is available for the single filer apparatus. The single filer zone 114 of this FIG. 11 embodiment of the invention is relatively shorter than that used in connection with the FIG. 1 and FIG. 7 embodiments. Accordingly, the present apparatus is more adaptable for use as a substitute or replacement for existing equipment in an already installed line of container handling equipment. In general, the more compact arrangement is derived by shortening the waterfall section and by eliminating the cascade component previously utilized. For this installation the containers 121 that are initially in an upright orientation are delivered by the waterfall section 112 of shortened length to fall downwardly into the free air zone 145 of the single filer section 114. The free air zone 145 is essentially defined by guide rails 164 and the curved guide rail 136 that extends upwardly and out of the single filer zone 114. Guide rails 136 also continue downwardly out of the free air zone 145 and into the layout zone 150 where they become the bottom rails 143.

For this single filer apparatus the gravitational influences acting on the containers cannot be as beneficially utilized as in the previous embodiments where a weir section is used. Gravitational influences, however, are used in the area adjacent curved rails 136 and directly aligned thereabove, since an accumulation of containers in this area will be acted on by gravitational influences to move the containers 122 into single file arrangement along the guide rails 136 and 143 as the containers move downwardly and along such rails.

Since the area in which cans may stack one above the other and, accordingly, the area for beneficial gravitational forces is somewhat limited, this embodiment of the invention is more significantly dependent upon the proper application of forces derived through use of air under pressure. The bulk air introduced into the layout zone 150 and to the single filer free air zone 145 is used to move containers received in such zones toward positions that will contribute to eventual disposition in single file side-by-side arrangement in the layout zone 150 and downstream thereof as the containers are moved into the output carrier track structure 172.

For this embodiment of the invention there is essentially no bulk storage zone, such as the previous zone 13, and there is no ramp, such as the ramp 16, that helped to define such zone. The containers fall freely from the waterfall section 112 down into the air single filer section 114 with such free fall being inhibited only by the bulk air introduced into the single filer free air zone 145. In addition to cushioning the fall of the containers 122 as they move downwardly into eventual contact with the tracks 136 and 143, the bulk air in this zone 145 tends to move the containers into position against the rails 136 and 164 as shown in both FIGS. 11 and 13. This result is obtained since the pressurized air in the free air zone 145 would escape through such essentially open rails and out of the apparatus if containers were not disposed therealong in side-by-side relationship to occlude such escape path. It is then the containers themselves that are moved into aligned positions along the guide rails that help to define the operative free air zone 145.

Figure 13:
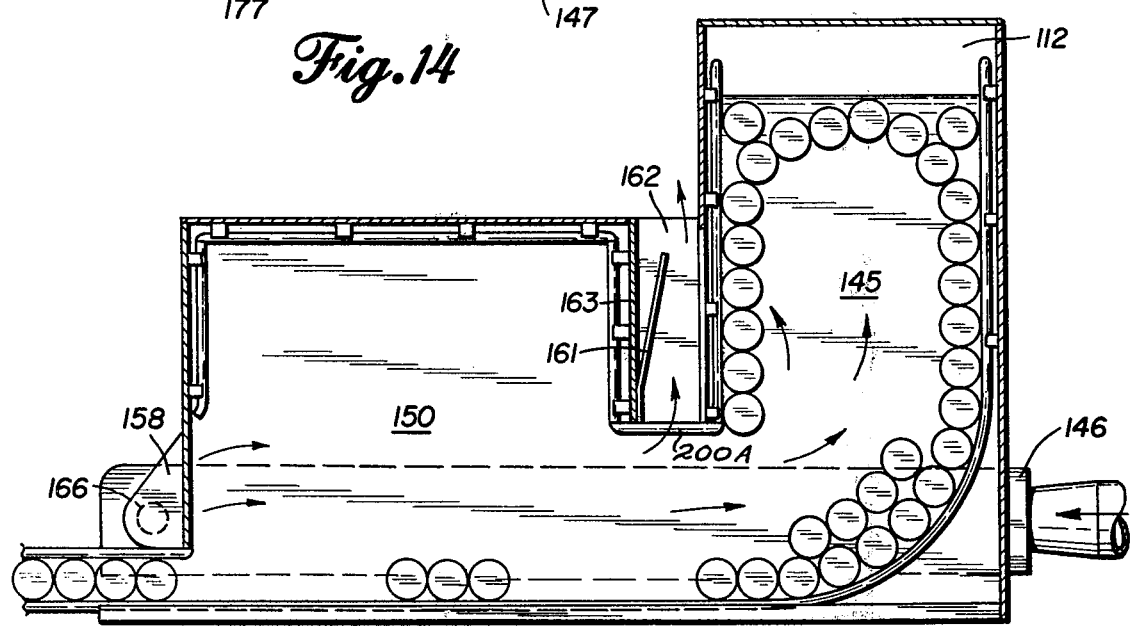
FIG. 13 is a side elevation showing a separate operating status of such embodiment.

For the static condition shown in FIG. 13 where no containers are being delivered from the single filer apparatus, the containers in the zone 145 will be disposed in the arched configuration illustrated with additional containers aligned along the rails 136 and 164 to occlude major escape of air from such zone. In the dynamic condition as shown in FIG. 11 the specific container marked by the number 122 is falling along the guide rail 136. At the same time there is a tendency for any of the loose containers circulating centrally in the zone 145 to be moved toward a position that will fill the gap between the marked container 122 and the next lower container. The flow of bulk air toward such point of escape will carry a loose container with it. Containers in the zone 145 then are moved by the bulk pressurized air in such zone toward positions of side-by-side alignment against the rails 136 and 143. Delivery into the air single filer should provide an excess of cans in the zone 145 so that passages for the escape of air past the guide rails can be plugged by containers that are carried by excess air toward such points of escape.

Bulk air in the layout zone 150 is used for a similar purpose, and, accordingly, by the time the containers are disposed along the lower open guide rails 143, a near solid arrangement of containers will be observed. As in the previous embodiments, the particular zones 145 and 150 are again defined by the side plates 148 and 149 and by the remaining confining walls, such as the top cover 151 and the downstream chimney wall 163.

The bulk air that is moved into the zones 150 and 145 is delivered by the plenums 146 and 147 to pass inwardly through the openings 166 and 167 at the downstream end of such plenums. The air passing through these openings is released in a reverse direction through the elongated reversing chamber slots 158 and 159 in a sheet flow that is initially adjacent the confining sidewalls 148 and 149. Flow of bulk air from the plenums and through the openings 166 and 167 is controlled by butterfly valves 176 and 177 disposed in the plenums 146 and 147. See FIGS. 12 and 14. These butterfly valves are movable to positions for closing off the flow of air from the plenums 146 and 147 to the openings 166 and 167.

As in the previous embodiments of the invention, pressurized air is also delivered by the plenums 146 and 147 through the directed air jet suppressor nozzles 152 and 154. These nozzles are again drilled so that the air expelled therefrom will have a downwardly and forwardly directed disposition with the nozzles 152 being positioned in a continuous row at an elevation just above the top limit of containers coursing along the bottom rails 143. The additional air jets 154 are disposed in a discontinuous row with the full representative distribution of such jet nozzles being shown in FIG. 11. The upstream grouping of such nozzles is disposed in a position corresponding to the placement of the chimney 162 and of the downstream chimney wall 163. The downstream grouping of such nozzles 154 is again positioned just upstream from the point of exit for the containers from the air single filer 114 and into the output delivery track 172 or an alternate curved track 172A. This downstream grouping of nozzles 154 is used again as additional suppressor nozzles that will tend to better assure entry of the containers into the output track 172 and under the confining top 169 thereof. The upstream grouping of nozzles 154 tends to compact the containers that are disposed along the bottom track 143 and to move the containers downstream if slack exists. If a gap is created between the containers through action of the upstream suppressor jets 154, loose containers in the zone 150 that circulate just downstream of the chimney wall 163 will be moved immediately by the escape of bulk air in such zone to fill the gap.

As in the previous embodiments, additional control of the bulk air in the zones 150 and 145 is obtained through use of a chimney 162. For this embodiment of the invention the chimney and its operation is relatively simpler since less control seems to be necessary. A vane 161 of perforated metal is positioned in the chimney, and the air introduced through the bottom of the chimney or past the rails 164 and any containers disposed therealong can exit by movement through the openings in the vane 161 or past an upper free edge thereof. When no delivery of containers is being made from the air single filer as illustrated in FIG. 13, the vanes 161 will itself be moved to a more open condition as illustrated, and a substantial quantity of air will be emitted through the chimney 162, while cans will be prevented from escaping by being supported on rails 200A.

When the apparatus of any of the embodiments has been closely adjusted to provide the desired output delivery of containers, little excess air is exhausted through the respective chimney sections. One function of the chimney installation, therefore, is to provide release for excess air buildup while a major function is to provide a balance between the bulk air dispositions in the layout zone 150 and the free air zone 145. Most all functional operations of the chimney can be alternately provided through provision of a plurality of openings directly through the zone defining sidewalls 48 and 49. Where these same sidewalls are covered by barrier materials 47 providing sound suppression, selective and differential movement of the sound barrier can valve and control the escape of excess bulk air out of the zones 150 and 145.

Presently operative apparatus has perforated metal in the single filer zone 14 in substitution for the sheet sidewalls 48 and 49. The chimney is eliminated, and, accordingly, the total unit length is reduced. The metal is perforated to have ⅛th inch round openings spaced ⅜ths inch apart on centers. Sound control barrier material such as insulation board and the like as at 47 may be supported by suitable means (not shown) adjacent the outside surfaces of the sidewalls 48 and 49, and the barrier material may be moved by suitable means (not shown) inwardly and outwardly toward and away from contact with the perforated metal in order to provide escape of excess bulk air from the zones 45 and 50. The side panels 48 and 49 are actually perforated in areas extending downwardly below the ramp 36, but this is of no consequence since air is blocked from escaping to the back side of the ramp by the presence of cans. Necessarily, the perforated metal acts in such operative apparatus in substitution for the chimneys 62 of the other described embodiments and the additional vent component 80 of the FIG. 7 embodiment.

For all embodiments of the invention, the ramps providing the lower container retaining elements may be of open type construction with side rails that engage only the ends of containers being provided. A large central portion of the containers is then accessible and exposed to be grasped by an operator who can simply introduce his hand or hands past the side rails to engage the containers. This open and accessible arrangement is desirable, since cans that are bent can then be grasped by the operator to facilitate removal of the can downwardly and past such rails. Any cans that are misoriented will move toward the opening between the rails and fall through to exit the apparatus. Since the walls 48 and 49 are closely spaced with respect to the length of the containers, it is usually necessary to crush the can to effect such removal, but at least the bent or stuck can is removable to eliminate disruption of the single filer apparatus operations.

The open bottom ramp arrangement for any of the shown and described embodiments is not deleterious from the standpoint of air control, since the bulk air in the zones 45, 50, 145 and 150 will not escape excessively past the open ramps when a layer or layers of containers are disposed thereagainst. As previously set forth, movement of bulk air toward a point of escape along such open ramps will regularly carry containers toward such point of escape to block the air exit passage and to further and beneficially arrange the containers in the desired side-by-side relationship.

Figure 15:
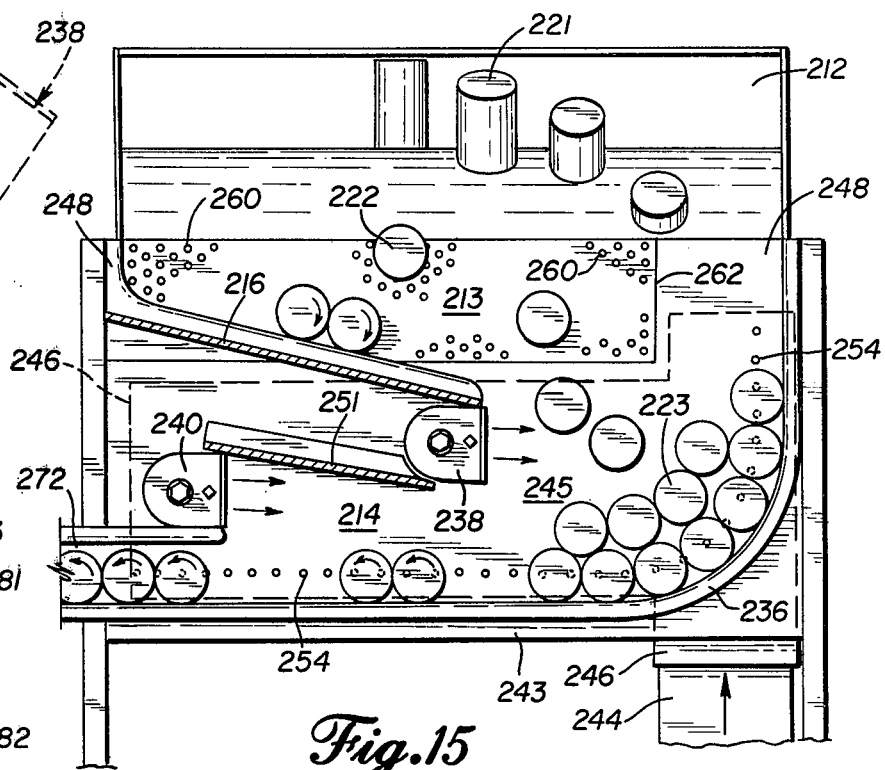
FIG. 15 is a side cross-sectional elevation similar to that of FIG. 1 showing still a further embodiment of the invention having a plurality of air turning plenums or blowback nozzles.

A still further embodiment of the invention is shown in FIG. 15. This configuration of the invention is also intended for use where less space is available for the single filer apparatus like the apparatus of FIGS. 11–14. The components in the illustrated embodiment include the waterfall segment or zone 212. The single filer zone 214 of this embodiment is relatively shorter than that of the embodiments of FIG. 1 and FIG. 7. Thus, this apparatus is also better adapted for use as a substitute or replacement for existing equipment in an already installed line of container handling equipment. The more compact arrangement has a greater waterfall width and has eliminated the cascade. The containers 221 that are fed in an upright position are delivered by the waterfall section 212 to fall downwardly through a bulk storage zone 213 which includes a sloping ramp 216 that directs cans falling thereon into a free air zone 245 of the single filer section 214. The bulk storage zone 213 is located intermediate the waterfall 212 and the lower ramp 236 which directs cans 221 toward the single filer. The free air zone 245 is essentially defined by the ramp 216 and the guide rails forming ramp 236. The cans coming off the ramp 216 are moved to the right by a stream of air issuing from nozzles 238 and 239 positioned beneath the lower end of ramp 216 and is supplied with air from plenums 246 and 247 or other suitable source. The nozzles 238–239 provide an air turning plenum or blowback airstream and blow cans in the free air zone into a stack of cans or ramp 236 as at 223. The container in the bulk storage zone 213 and the single filer zone 214 are buffeted and moved directionally by the flow of air delivered under pressure to obtain or enhance the desired output result. An important part of the bulk storage design is the provision of apertures 260 in sidewalls 248 and 249 in a pattern 262 such that air from nozzles 238, 239, 240, 241 254 and 256 flowing into free air zone 245 is allowed to escape through these apertures allowing the containers 222 to drop through the bulk storage zone to be stacked as at 223 for introduction into the single filer zone 214 by nozzles 254 and 255. The pattern 262 of apertures 260 are even of greater importance in directing the flow of containers through the bulk storage area of the multistream single filer embodiments.

The containers in the single filer zone are subjected to the action of directed flow jet nozzles in the bulk storage zone adjacent the guide rails 236 and extending into the free air zone 245. Air under pressure that has been introduced through a conduit 244 to separate plenums 246 and 247 disposed at the opposite lateral sides of the container define delivery walls 248 and 249 that are a continuum of the sidewalls 248 and 249 of the single filer zone 214. Sidewalls 248 and 249 are spaced apart a distance that is slightly greater than the lateral dimension of the containers to be worked on. The sidewalls 248 and 249 are continued out into the single file layout zone 214 which is essentially defined by the sidewalls 248 and 249, a top enclosure 251 and bottom track 243. The plenums 246 and 247 are disposed alongside and outside of the walls 248 and 249 and a plurality of jet nozzles 254 and 255 are drilled through the walls 248 and 249, respectively, to deliver angularly disposed jets of air against the containers to move the containers forwardly along the bottom tracks 236 and 243.

The air from the conduit 244 and plenums 246 and 247 which is in excess of that delivered through nozzles 254 and 255 and forward blowback nozzles 238 and 239 moves rearward and is exhausted into free air zone 245. Air from blowback nozzles 240 and 241 force the containers 222 down against the rails of track 243 as the containers move along such rails. The bulk air introduced into the layout zone 214 and to the single filer free air zone 245 is used to move containers received in such zones towards positions that will contribute to eventual disposition in single file side by side arrangement in the layout zone 214 and downstream thereof as the containers are moved into the output carrier track structure 272.

For this embodiment of the invention the bulk storage zone is established by the provision of apertures 260 in the sidewalls to form a pattern 262 such that the air from all sources flowing into the free air zone 245 is allowed to escape therethrough such that the containers 222 are not buoyed up but rather tend to accumulate or fall through this zone. In addition to cushioning the fall of the containers 222 as they move downwardly into eventual contact with rails 236 and 243, the bulk air in the zone 245 tends to move the containers into position against the rails 236 and 243. This result is obtained since the pressurized air in the free zone 245 would escape through such essentially open rails and out of the apparatus if containers were not disposed therealong in side by side relationship to occlude such escape path. It is thus the containers themselves that are moved into aligned positions along the guide rails that help to define the operative free air zone 245. In operation there would normally be a solid row of containers along the track 243. There is a tendency for any of the loose containers circulating centrally in the zone 245 to be moved toward a position that will fill the gap between containers on track 243. The flow of bulk air toward the gap will carry a loose container with it.

Figure 16:
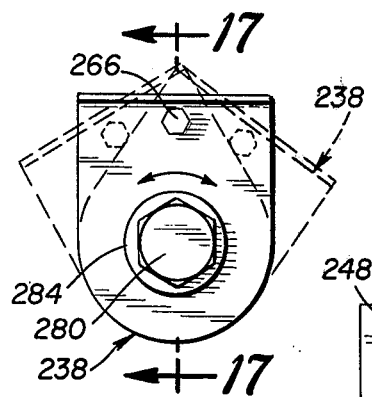
FIG. 16 is a side elevation of one of the blowback nozzles.
Figure 17:
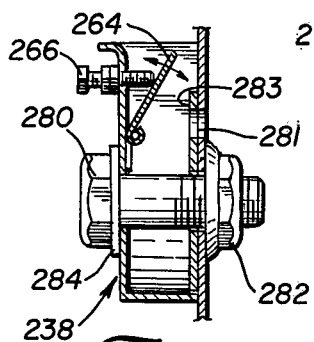
FIG. 17 is a cross-sectional view along line 17—17 of FIG. 16.

The bulk air that is moved into the zones 214 and 245 is delivered by the plenums 246 and 247 to pass inwardly through the blowback nozzles 238, 239, 240 and 241 in a sheet flow that is initially adjacent the confining sidewalls 248 and 249. Flow of bulk air from the plenums and through the blowback nozzles is controlled by a flapper valve 264 (FIG. 17) in each of the blowback nozzles. The valves are actuated independently by suitable means such as a control wire, not shown, and are each held against further opening by means of a bolt 266 providing a step being threadedly received by a nut suitably secured to the wall of a nozzle. Further, the blowback nozzles are pivotally attached to the sidwalls 248 and 249 such that the direction of air issuing therefrom can be selectively adjusted to tune and adjust the system (FIG. 16).

When the apparatus of any of the embodiments of the parent application have been closely adjusted to provide the desired output delivery of containers, little excess air was exhausted through the respective chimney sections, 62 and 162. A function of the chimney was to provide release for excess air build up while a major function was to provide a balance between the bulk air dispositions in the layout zone 150 and the free air zone 145. In the present embodiment the provision of the forward blowback nozzles provides means of more close adjustment of air issuing into the free air zone 245 of the system. The provision of a plurality of apertures 260 in sidewalls 248 and 249 communicating with the bulk storage zone 213 provides a selected bulk storage pattern 262 that will valve and control the escape of excess bulk air out of zones 214 and 245. As will be appreciated the sidewalls 248 and 249 can preferably be entirely of perforated configuration and the bulk storage pattern may be obtained by the use of airflow barrier material, not shown, which may also be sound absorbing material such as insulation board. Where sound barrier material is used it may be moved by suitable means, not shown, inwardly and outwardly, toward and away from contact with the perforated sidewalls in order to provide escape of excess bulk air from the zone 245 and 214. Once the desired flow pattern is established, it may be desirable to render the bulk storage pattern 262 more permanent by covering the openings 260 with pressure sensitive tape and the like to produce the desired bulk storage pattern. It will also be appreciated that the blowback nozzles 238, 239, 240 and 241 can be pivoted to selectively direct air issuing therefrom and the flapper valve 264 is adjustable to control the volume of air issuing, see FIGS. 16 and 17. The blowback valves are secured to the sidewalls 248 and 249 by means of a bolt 280 threadedly received by a nut 282 secured to the sidewalls by suitable means such as welding, not shown. Blowback air inlet apertures 281 are provided in the sidewalls communicating the nozzles to the plenum 246. A vane 283 having holes that mate with the holes in the sidewalls may be provided as a means of controlling the volume of air passing from the plenum into each blowback valve. The blowback valve 238 may be provided with an opening 283 which is larger than the diameter of the bolt 280 and a washer 284 of a larger diameter than hole 283 is positioned under the head of the bolt to permit lateral and longitudinal movement and adjustment of the individual blowback nozzles. Thus, the directivity and volume of air introduced into the zones 214 and 245 are balanced with the air and pattern of escape through the apertures of sidewalls 248 and 249 to provide the desired bulk storage zone 213. As seen in FIG. 15, the bulk storage pattern 262 is shown essentially rectangular in shape for a single out single filer whereas different bulk storage patterns are preferred for two out, FIG. 18 and four out, FIG. 19, single filers.

Figure 18:
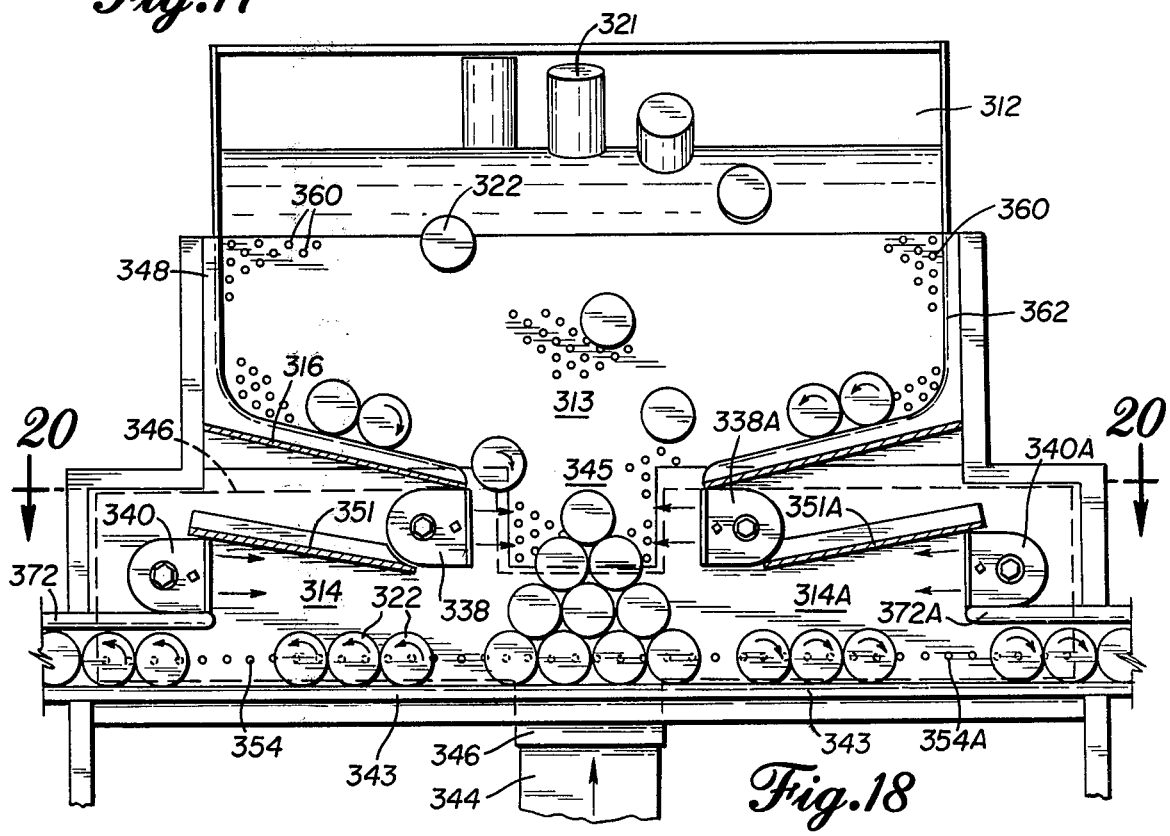
FIG. 18 is a side cross-sectional elevation similar to that of FIG. 1 showing still another embodiment of the invention having a plurality of air turning plenums or blowback nozzles in conjunction with a dual single filer arrangement.

Referring now to FIG. 18, there is shown a double blowback, two out, single filer according to the invention. This embodiment moves containers 321 via waterfall 312 into a bulk storage zone 313. The bulk storage zone configuration is determined by the bulk storage pattern 362 of holes 360 through sidewalls 348 and 349 that are left to permit air from the free air zone 345 to escape allowing the containers 322 to settle and accumulate in the free air zone 345. The air issuing from the nozzles 338 and 338A blows the containers into a stack in the free air zone 345 resting on guide rails 343. The containers at the bottom of the stack are subjected to the action of directed air flow from jet nozzles 354, 354A, 355 and 355A adjacent the guide rails 343. Nozzles 354 and 355 direct the containers along rails 343 to the right single file zone 314 and nozzles 354A and 355A direct the containers along rails to the right single file zone 314A. The lower nozzles 340, 341, 340A and 341A direct air into the single filer zones 314 and 314A to keep the containers in contact with the rails 343 for delivery to output track structure 372 and 372A. As in the earlier embodiments, air is supplied from a conduit 344 to plenums 346 and 347 for delivery to nozzles 338, 339, 340, 341, 338A, 339A and 340A, 341A as well as jet nozzles 354, 355, 354A and 355A. Again, the free air zone 345 is essentially defined by ramp 316 and the guide rails 343 while the single filer zone 314 to the left is essentially defined by enclosure 351, sidewalls 348, 349 and guide rails 343 while to the right, the single filer zone 314A is essentially defined by the enclosure 351A, sidewalls 348, 349 and guide means 343.

Figure 19:
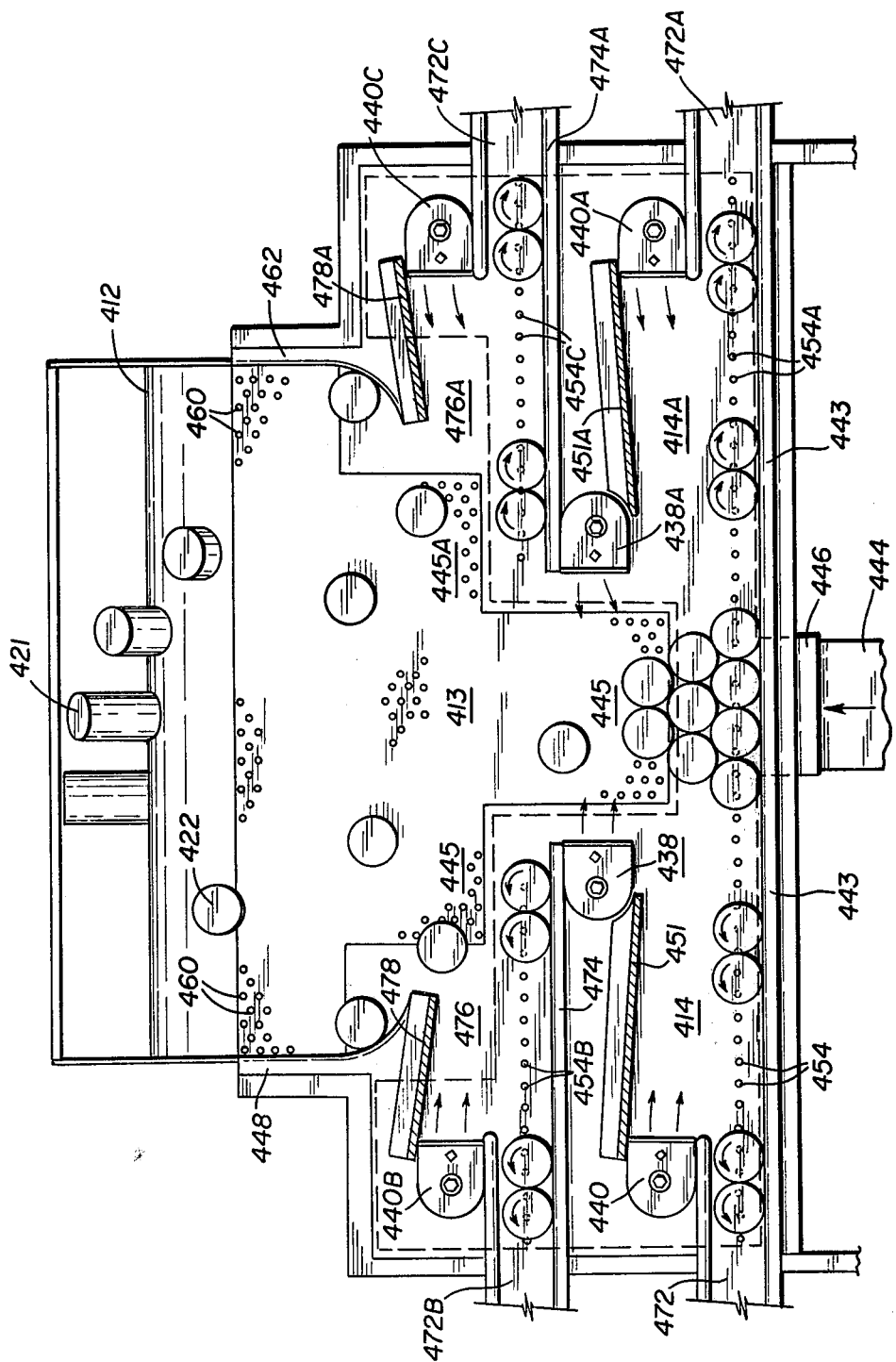
FIG. 19 is a side cross-sectional elevation similar to that of FIG. 18 illustrating another embodiment with a quadruple single filer arrangement; and, FIG. 20 is a cross-sectional view along line 20—20 of FIG. 18.
Figure 20:
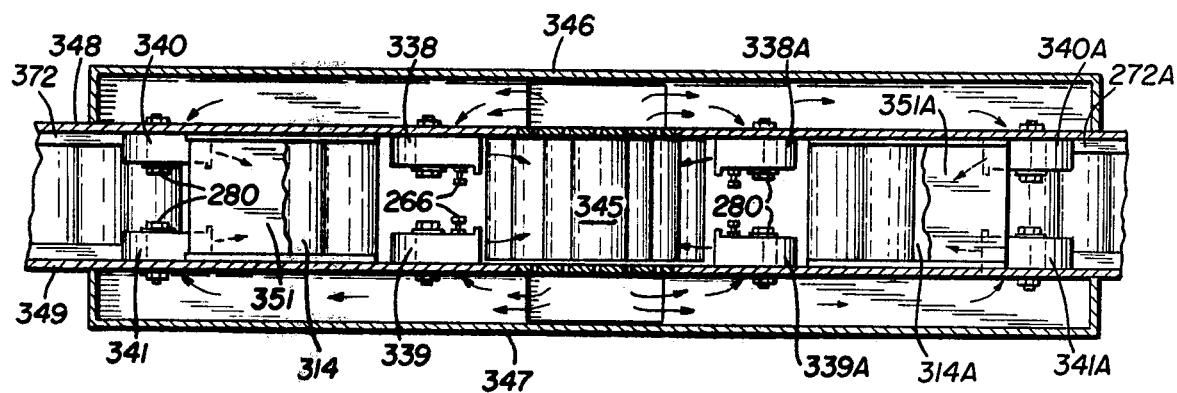

Referring now to FIG. 19, there is shown a triple blowback, four out single filer according to the invention. This embodiment moves containers 421 via waterfall 412 into a bulk storage zone 413. The bulk storage zone configuration is determined by the bulk storage pattern 462 of holes 460 in the sidewalls 448 and 449 that are provided or left open in the sidewalls where they are constructed of perforated sheet metal. The open apertures 460 permit air from the free air zone 445 to escape allowing the containers 422 to settle and accumulate in the free air zone 445. The air issuing from nozzles 438 and 438A blows the containers into a stack in the free air zone 445 resting upon guide rails 443. The containers at the bottom of the stack are subjected to the action of directed air flow from jet nozzles 454, 454A, 455 and 455A adjacent the guide rails 443. Nozzles 454 and 455 direct the containers along rails 443 to the left single file zone 414 and nozzles 454A and 455A direct the containers along rails 443 to the right single file zone 414A. The lower blowback nozzles 440, 441, 440A and 441A direct air into the left and right single filer zones 414 and 414A respectively to keep the containers into contact with the rails 443 for delivery to the respective output track structures 472 and 472A. Enclosures 451 and 451A provide the top of single filer zones 414 and 414A.

An additional single filer output track structure 472B and 472C are provided immediately above the upper blowback nozzles 438, 438A, 439 and 439A and guide rails 474 and 474A are provided to support the containers delivered to the upper single filer zones 476 and 476A. A series of air jet nozzles 454B and 454C are provided adjacent the guide rails 474 and 474A and air issuing therefrom the plenums 446 and 447 serve to direct the containers on guide rails 474 and 474A, respectively, to output track structure 472B and 472C, respectively. The single filer zones 476 and 476A are respectively essentially defined by tops 478 and 478A, sidewalls 448 and 449 and guide rails 474 and 474A. An upper pair of blowback nozzles 440B and 440C are positioned immediately above the respective output track structure 472B and 472C to deliver directed air into the single filer zones 476 and 476A such that the containers are pushed into contact with each other. Thus, it is seen that with the present invention it is possible within a limited amount of space to deliver plural single files of containers. While two and four single file versions are illustrated, it is believed obvious to those skilled in the art that a greater number of single files could be provided as desired.

The perforation pattern of the sidewalls again may be obtained by custom design or the sidewalls may be made of perforated sheet metal and portions of the perforations blocked off by suitable means to form the desired pattern. In each embodiment, perforations are provided in the sidewalls adjacent the bulk storage zone. In the two and four out embodiments, the perforations in the sidewalls extend also into the free air zone. It is also envisioned that the perforations in the sidewalls may be blocked or partially blocked by sound barrier material such as insulation board and may be movable by suitable means, not shown, toward and away from the sidewalls to control the escape of air and/or noise.

What is claimed:

1. An apparatus for receiving articles in random bulk and for discharging same serially in single file which comprises:
   a pair of sidewalls held in spaced relation defining therebetween a bulk storage zone, a free air zone and an adjacent layout zone having a layout path with the sidewalls being spaced apart a distance slightly greater than the height of an article to be worked upon;
   a plenum adapted to be connected to a source of air under pressure attached to either sidewall in coextensive relation, with the plenum at its extremity exhausting into the layout zone in opposition to the direction of normal flow of articles therethrough and the plenum at an intermediate position exhausting into the free air zone in opposition to the direction of normal flow of articles therethrough;
   a plurality of openings through the sidewalls communicating the plenums with the layout zone and positioned essentially parallel to the lower extremity of the sidewalls; and
   exhaust means positioned intermediate the bulk storage zone and the layout zone to exhaust air from the free air zone.
2. The apparatus of claim 1 wherein the plurality of openings comprise air jet nozzles angularly disposed to direct jets of air forwardly against articles to move the articles down into contact with the layout path and away from the bulk storage zone to a point of discharge.
3. The apparatus of claim 2 wherein the layout path of the layout zone comprises a guide rail attached to each side adjacent the lower extremity thereof to support and guide articles through the layout zone to a point of discharge.
4. The apparatus of claim 2 wherein the layout path of the layout zone comprises a bottom member secured to the sides adjacent the lower extremity.
5. The apparatus of claim 2 wherein the plurality of openings are positioned in a row to exhaust into and/or onto the ends of articles within the layout zone along the layout path.
6. The apparatus of claim 1 wherein a plurality of layout zones are defined by said sidewalls to each side of the bulk storage and free air zones adapted to provide a plurality of layout paths for discharging articles in multiple single files.
7. The apparatus of claim 1 wherein at least one upper and one lower layout zone is defined by said sidewalls to each side of the bulk storage and free air zones with the plenum at its extremity exhausting into the upper and the lower layout zones in opposition to the direction of normal flow of of articles therethrough.
8. The apparatus of claim 1 wherein the exhaust means comprises a pattern of openings in the sidewalls essentially coextensive with the bulk storage and free air zones.
9. The apparatus of claim 1 wherein a first pair of blowback nozzles interconnect the plenum at its extremity with the layout zone and a second pair of blowback nozzles interconnect the plenum at an intermediate position with the free air zone.
10. The apparatus of claim 6 wherein a pair of blowback nozzles interconnects the plenum at its extremity with each layout zone.
11. An apparatus for receiving articles in random bulk and for discharging same serially in single file which comprises:

a pair of perforated sidewalls held in spaced relation defining therebetween a bulk storage zone, a free air zone and an adjacent layout zone having a layout path with the sidewalls being spaced apart a distance slightly greater than the height of an article to be worked on;

a plenum adapted to be connected to a source of air under pressure attached to either sidewall in coextensive relation, with the plenum at its furthermost extremity exhausting into the layout zone in opposition to the direction of normal flow of articles therethrough, and, the plenum at an intermediate position exhausting into the free air zone in opposition to the direction of normal flow of articles therethrough; and, a plurality of air jet openings through the sidewalls communicating the plenums with the layout zone and positioned essentially parallel to the lower extremity of the sidewalls, said perforated sidewalls providing exhaust means for exhausting air from the free air zone.

12. The apparatus of claim 11 wherein a plurality of layout zones are defined by said sidewalls to each side of the bulk storage and free air zones adapted to provide a plurality of layout paths for discharging articles in multiple single files.

13. The apparatus of claim 11 wherein at least one upper and one lower layout zone is defined by said sidewalls to each side of the bulk storage and free air zones with the plenum at its extremity exhausting into the upper and the lower layout zones in opposition to the direction of normal flow of articles therethrough.

14. The apparatus of claim 11 wherein the exhaust means comprises a pattern of openings in the sidewalls essentially coextensive with the bulk storage and free air zones.

15. The apparatus of claim 11 wherein a first pair of blowback nozzles interconnect the plenum at its extremity with the layout zone and a second pair of blowback nozzles interconnect the plenum at an intermediate position with the free air zone.

16. The apparatus of claim 11 wherein a pair of blowback nozzles interconnects the plenum at its extremity with each layout zone.

17. The apparatus of claim 11 including barrier means of a pattern essentially coextensive with all but the bulk storage and free air zones to provide control of the escape of air from the bulk storage and free air zones.

18. The apparatus of claim 17 wherein the barrier means comprises sound barrier means positioned adjacent the perforated sidewalls in a manner adapted to be moved inwardly and outwardly toward and away from contact with the sidewall perforations to provide control of the escape of the air from the bulk storage and free air zones.

19. An apparatus for receiving articles in random bulk and for discharging same serially in single file which comprises:

a pair of perforated sidewalls held in spaced relation defining therebetween a bulk storage zone, a free air zone and an adjacent layout zone having a layout path with the sidewalls being spaced apart a distance slightly greater than the major dimension of an article to be worked on;

a plenum adapted to be connected to a source of air under pressure attached to either sidewall in coextensive relation, with the plenum at its extremity exhausting into the layout zone in opposition to the direction of normal flow of articles therethrough;

a plurality of air jet openings through the sidewalls communicating the plenums with the layout zone and positioned essentially parallel to the lower extremity of the sidewalls; and, sound barrier means positioned adjacent the perforated sidewalls in a manner adapted to be moved inwardly and outwardly toward and away from contact with the sidewall perforations to provide control of the escape of air from the bulk storage and layout zones.

* * * * *